United States Patent [19]

Mouri et al.

[11] Patent Number: 4,987,390
[45] Date of Patent: Jan. 22, 1991

[54] SUPERCONDUCTING REVERSIBLE VARIABLE INDUCTOR

[75] Inventors: Kaneo Mouri, Nagoya; Masahide Wakuda; Noriaki Baba, both of Kariya, all of Japan

[73] Assignee: Kabushiki Kaisha Toyoda Jidoshokki Seisakusho, Aichi, Japan

[21] Appl. No.: 403,090

[22] Filed: Sep. 5, 1989

[30] Foreign Application Priority Data

Sep. 14, 1988 [JP] Japan .................................. 63-230541

[51] Int. Cl.$^5$ .............................................. H03C 1/00
[52] U.S. Cl. .................................... 332/173; 331/187
[58] Field of Search ................. 332/173, 185; 331/187

[56] References Cited

U.S. PATENT DOCUMENTS 3,718,872 6/1971 Takeuchi .............................. 332/173

Primary Examiner—Robert J. Pascal
Attorney, Agent, or Firm—Burgess, Ryan & Wayne

[57] ABSTRACT

A superconducting reversible variable inductor of this invention comprises: a core made of a Type II superconductor having a reversible magnetic permeability variation range in which the magnetic permeability varies reversibly with respect to a variation of a magnetic field of a predetermined strength or less and falling in the range of from a lower critical magnetic field or more to an upper critical magnetic field or less; and one or more coils wound around the core. The superconductor reversible variable inductor has good linear controllability and high speed response of the inductance.

11 Claims, 2 Drawing Sheets

MAGNETIC SENSOR

SUPERCONDUCTING REVERSIBLE VARIABLE INDUCTOR

BACKGROUND OF THE INVENTION

1. Field of the Invention

This invention relates to a superconducting, reversible, variable inductor capable of electromagnetically varying inductance in a reversible manner. For instance, a superconducting, reversible, variable inductor according to this invention can be applied to various modulators of high speed response type, variable frequency oscilators and the like.

2. Description of Prior Art

There have been known two types of superconductors. One of the superconductors is a Type I superconductor. The Type I superconductor exhibits complete diamagnetism and superconductivity in the range of critical magnetic field Hc or less, and ordinary conductivity in the range of the critical magnetic field Hc or more. The other is a Type II superconductor. The Type II superconductor exhibits complete diamagnetism and superconductivity in the range of a lower critical magnetic field Hc1 or less, superconductivity and incomplete diamagnetism, namely a mixed state, in the range of from the lower critical range Hc1 to an upper critical magnetic field Hc2 or less, and ordinary conductivity and paramagnetism in the range of the upper critical magnetic field Hc2 or more.

Conventionally, superconducting modulators have been proposed, in which a coil is wound around a core made of a Type I superconductor. The inductance of the modulators is varied by applying heat pulses to the core.

Further, there have been known variable inductors whose inductance is varied linearly by moving a magnetic core, such as a ferrite core. Other than the above described variable inductors, there have been known variable inductors whose inductance is varied non-linearly by a magnetically saturable a magnetic core thereof.

However, the conventional superconducting modulators have problems of low speed response due to the slow heat conduction and bad controllability caused by using heat as a control factor. These problems result from the fact that the conventional superconducting modulators utilize the heat pulses applied repeatedly to the core, thereby effecting the change from the complete diamagnetism to the paramagnetism, or vice versa.

The conventional variable inductors utilizing the movement of the magnetic core have complicated structures. In addition, the variable inductors cannot vary the inductance at a high speed. Further, it is hard to apply the other conventional variable inductors emplying the magnetic saturation of the magnetic core to circuits for linear applications.

SUMMARY OF THE INVENTION

This invention has been developed in order to solve the above-mentioned problems. It is therefore an object of this invention to provide a superconducting, reversible, variable inductor having good linear controllability and high speed response of the inductance.

A superconducting, reversible, variable inductor according to this invention comprises: a core made of a Type II superconductor having a reversible magnetic permeability variation range in which the magnetic permeability varies reversibly with respect to a variation of a magnetic field of a perdetemined strength or less and falling in the range of from a lower critical magnetic field or more to an upper critical magnetic field or less; and one or more coils wound around the core.

The magnetic field variation is generated by an externally applied magnetic field variation or current variation passed in the coils.

The reversible magnetic permeability variation range means that the magnetic field variation range of from a lower critical magnetic field or more to a predetermined strength or less, wherein the predetermined strength is in the range of from a lower critical magnetic field or more of a Type II superconductor to an upper critical magnetic field or less thereof. In the reversible magnetic permeability variation range, the magnetic permeability of the Type II superconductor varies linearly with respect to the magnetic field variation, and when the applied magnetic field decreases and reaches the lower critical magnetic field, the magnetic permeability of the Type II superconductor becomes susbtantially zero (0) for the ideal case due to the meissner effect, but to a very small initial value in actual cases because of leakage inductance.

Accordingly, when operating the superconducting, reversible, variable inductor of this invention in the reversible mangentic permeability variation range, the superconduring reversible, variable inductor can have inductance varying reversibly and substantially in a linear manner with respect to the magnetic field variation.

As for the Type II supereconductor, the following may be employed when it exhibits the reversible, magnetic, permeablity variation: superconductor of yttrium (Y) type like $YBa_2Cu_3O_{7-y}$, and oxide superconductors of bismuth (Bi) type, lanthanum (La) type, tantalum (Ta) type and titanium (Ti) type with a high critical Temperature Tc.

The coil wound around the core has an inductance variation characteristic. Namely, the inductance of the coil wound around the core increases and decreases in a uniform manner in accordance with the increment and decrement of the external magnetic field, i.e., an externally applied magnetic field and a magnetic field generated by currents passing in the wound coils, in the range of form the lower critical magnetic field to the upper critical magnetic field. The coil wound around the core also has a reversible and substantially linear, inductance variation characteristic (magnetic permeability variation characteristic) with respect to the increment and decrement of the external magnetic field, i.e., total applied magnetic field, in the above-mentioned reversible magnetic permeability variation range.

As for a form of the core, the core may be formed as a cylinder, a column, a ring and the allowing winding of the coil around the core. Further, the core may be formed by a tape or a wire winding, and the coils may be wound therearound. Further, the coil may be formed of a superconductor cable.

In the superconducting reversible, variable inductor of this invention, when an external magnetic field is applied to the core made of the Type II superconductor, in the reversible magnetic permeability variation range falling in the range of from the lower critical magnetic field or more to the upper critical magnetic field or less, the core varies the magnetic permeability thereof reversibly and in proportion of the externally applied magnetic filed. As a result, the inductance of the coils wound around the core varies reversibly and in proportion to the externally applied magnetic field.

As described above, the superconducting, reversible, variable inductor of this invention can vary the inductance thereof reversibly in the reversible magnetic permeability variation range falling in the range of from the lower critical magnetic field or more to the upper critical magnetic field or less. The superconducting, reversible, variable indcutor can be used as variable inductor of the igh speed response type due to the absence of eddy current losses.

In addition, the superconducting, reversible, variable inductor of this invention can be applied more effectively to circuits for linear applications when it is used in a reversible and liner magnetic permeability range generating the inductance free from the hysterisis variation.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawings, wherein:

FIG. 4 is a characteristic diagram illustrating magnetic characteristic curves of a core 1.

DETAILED DESCRIPTION OF THE PREFERRED EMBODIMENT OF THE INVENTION

Having generally described the invention, a further understanding can be obtained by reference to certain specific preferred embodiments which are provided herein for purposes of illustration only and are not intended to be limiting unless otherwise specified.

First Preferred Embodiment

Figure 1:
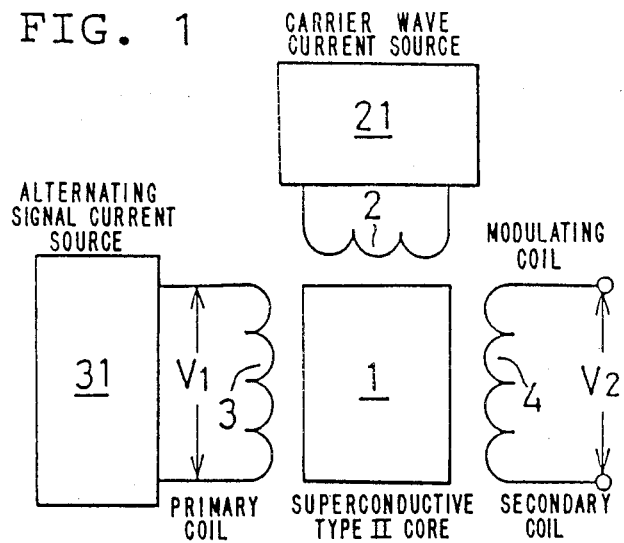
FIG. 1 is a block diagram of a modulator employing a superconducting, reversible, variable inductor according to this invention.

An AM (amplitude modulation) modulator employing a superconducting, reversible, variable inductor of a first preferred embodiment will be hereinafter described with reference to FIG. 1. This AM modulator comprises a disk-shaped core 1 made of $YBa_2Cu_3O_{7-y}$ $T_c = 95°$ K., a modulation coil 2, a primary coil 3 and a secondary coil 4. Both ends of the modulation coil 2 are connected to a carrier wave current source 21, and both ends of the primary coil 3 are connected to an alternating signal current source 31.

The primary coil 3 and the secondary coil 4 are wound around the outer surface of the core 1 in a ring shape. The modulation coil 2 is wound around the core 1 in a manner perpendicular to the primary coil 3 and the secondary coil 4, thereby decreasing a mutual inductance between the modulation coil 2 and the primary coil 3 and a mutual inductance between the modulation coil 2 and the secondary coil 4, and increasing a mutual inductance between the primary coil 3 and the secondary coil 4 at liquid nitrogen temperature (77° K.).

When an alternating signal current expressed by the formula, i.e., $Ia = Iam \times \sin\omega t$, is passed in the primary coil 3 and a carrier wave current expressed by the formula, i.e., $Ic = Icm \times \sin\omega ct$, is passed in the modulation coil 2, a magnetic field is generated by the currents. (Here, Iam is the maximum value of Ia, and Icm is the maximum value of Ic.) Whereby the magnetic permeability of the core 1 varies, and thhe mutual inductance between the primary coil 3 and the secondary coil 4 varies. Here, the carrier wave current Ic is far greater than the alternating signal current Ia, namely $Ic > Ia$, therefore the carrier wave current Ic mainly contributes to the generation of the magnetic field. An AM modulation voltage expressed by the formula, i.e., $V2 = K \times \{(1 + a \times (Iam \times \sin\omega t)\} \times \sin\omega ct$, is generated at the ends of the secondary coil 4 by the mutual inductance variation. Here, "K" and "a" are constants. However, the strength of the magnetic field applied to the core 1 by the carrier wave current Ic and the alternating signal current Ia is kept at the lower critical magnetic field Hc1 or more and held in the range generating the previously defined reversible magnetic permeability variation in the core 1.

The magnetic characteristic of the core 1 was then evaluated. In the evaluation, a coil was wound by 20 thurns, connected in series by way of a resistor of 1 KΩ, and subjected to a current of 20 mA and a sine wave voltage of 700 KHz applied at the ends thereof. The diameter of the core 1 was 25 mm, and the thickness thereof was 5 mm. The resistance of the wound coil was 0.2 Ω at the temperature of 77 K., and 2.3 Ω at room temperature.

The results of the evaluation thus obtained are illustrated in FIG. 4. FIG. 4 illustrates characteristic curves specifying the ratios of "L" to "Lo". In FIG. 4, "Hex" means the external magnetic field applied to the core 1, "L" means the residual inductance which remains therein even in the range of the lower critical magnetic field or less, and "L" means the inductance obtained. The residual indcutance "L" was 2.3 μH when measured at the temperature of 77 K.

In this evaluation, the alternating signal current passing in the coil provided the magnetic field which was necessary for generating the inductance variation in the core 1 even at the external magnetic field Hex=0. In other word, the alternating signal current provided the magnetic field in order to keep the total applied magnetic field in the range of the lower critical magnetic field or more.

It is understood from the characteristic curves "A" and "B" thus obtained that the inductance of the core 1 varied reversible in accordance with the increment and decrement of the external magnetic field Hex when the external magnetic field Hex was in the range of less than 20 oersteds (Hex<20), and that the inductance thereof returned to L/Lo=1 when the external magnetic field Hex was equal to zero (0) oersted (Hex=0).

In this first preferred embodiment, the core 1 is formed in a disk, but the core 1 may be formed in other forms. For instance, the core 1 may be formed as a troidal core, and the modulation coil 2, the primary coil 3 and the secondary coil 4 may be wound around the core 1 formed as a troidal core. However, when the core 1 is formed as a disk, the inductance thereof can be controlled by less external magnetic field Hex because the anti-magnetic field of the core 1 extends in the direction indentical to the external magnetic field Hex. Here, the anti-magnetic field means a magnetic field which is induced in the core 1 by the external magnetic field.

Figure 2:
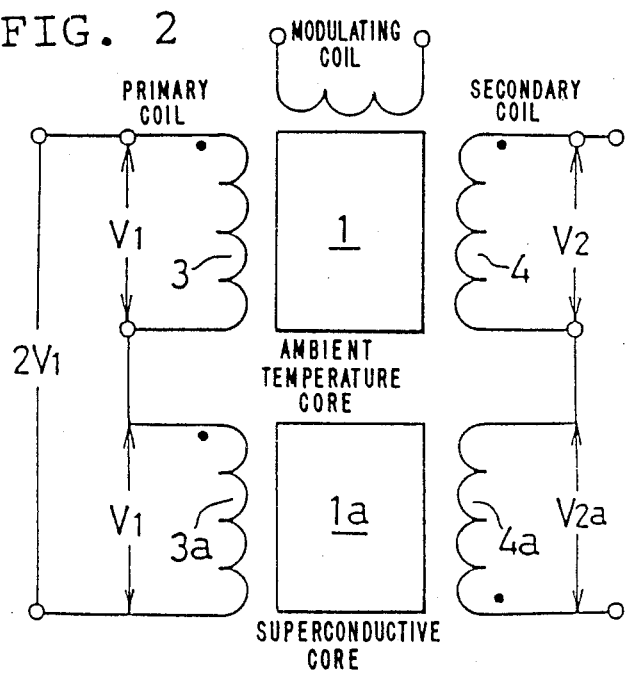
FIG. 2 is a block diagram of another modulator employing a superconducting, reversible, variable inductor according to this invention.

In FIG. 2, a modified embodiment of the above-mentioned first perferred embodiment is illustrated, which is provided with a compensative transformer for offsetting voltage at the ends of the secondary coil 4 generated in accordance with the residual mutal inductance between the primary coil 3 and the secondary coil 4 remained even at the external magnetic field Hex=0. The modified embodiment thereof can improve the degree of the modulation.

To be concrete, in the modified embodiment illustrated in FIG. 2, the cores 1 and 1a have an identical shape and are made of an identical material, the primary coils 3 and 3a and the secondary coils 4 and 4a have an identical shape and an identical number of turns, respectively. However, the core 1a is also cooled to the temperature of 77 K., and the secondary output voltage V2a is generated at the ends of the secondary coil 4a in accordance with the residual mutual inductance of offset the secondary output voltage generated at the ends of the secondary coil 4 in accordance with the residual mutual inductance.

Second Preferred Embodiment

Figure 3:
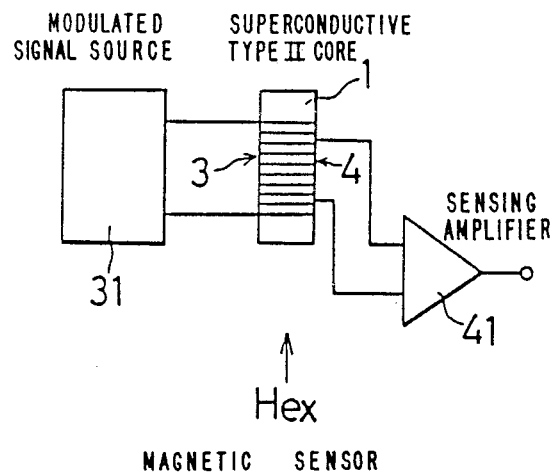
FIG. 3 is a block diagram of a magnetic sensor employing a superconducting, reversible, variable inductor according to this invention.

A magnetic sensor employing a superconductive, reversible, variable inductor according to this invention will be hereinafter described with reference to FIG. 3. FIG. 3 is a block diagram of the magnetic sensor. A primary coil 3 and a secondary coil 4 are wound around a core 1 having the identical shape with that of the first preferred embodiment. A weak current of one (1) MHz is supplied by a modulated signal source 31 and passed in the primary coil 3.

When the external magnetic field Hex varies in the range of from 0 to 20 oersteds as shown in FIG. 4, the mutual inductance between the primary coil 3 and the secondary coil 4 varies. The signal voltage generated at the ends of the secondary coil 4 is amplified by a sensing amplifier 41. The magnitude of the external magnetic field Hex can be detected by the magnitude of the output voltage amplified by the sensing amplifier 41, accordingly.

In each of the above-mentioned preferred embodiments, when the magnetic field exceeding the reversible magnetic permeability variation range has been applied to the core 1, the variation of the hysterisis characteristic of the inductance can be removed by putting the core 1 into an ordinary conductive state through a thermal treatment and the like, and then by putting the core 1 back into the supperconducting state.

Further, it is desirable to wind the coils around the core 1 as close as possible in order to reduce the leakage inductance. Furthermore, it is advantageous to make the core 1 thinner in the direction of the magnetic field in order to reduce the decrement of the internal effective magnetic field resulting from the anti-magnetic field.

The superconducting, reversible, variable inductor according to this invention can have not only the arrangements of the above-mentioned preferred embodiments but also the following arrangements:

(1) An inductor, in which the primary coil 3 is wound around the core 1 and an alternating current is supplied by an alternating signal current soruce and passed in the primary coil 3.

The self-inductance of this inductor is made variable dpending on the current magnitude, and thereby modulated alternating signal voltages can be obtained at the ends of the primary coil 3. Consequently, this inductor having inductance, which varies in accordance with the supplied current, can be applied to parametric amplifiers, frequency multipliers, upconverters, frequency tuners and the like in a manner similar to the application of variable capacity diodes, which vary thhe capacitance in accordance with the applied voltage, thereto. In addition, the modulated signal components may be extracted by the secondary coil 4.

(2) The secondary coil 4 of the second preferred embodiment may be omitted, and the magnetic field may be detected by the inductance variation of the primary coil 3.

(3) The inductor of the second preferred embodiment may be incorporated into an oscillation circuit to vary the oscillating frequency in accordance with the inductance variation caused by the magnetic field variation. Whereby the magnetic field variation can be detected through the frequency variation.

The important fact is that the variable inductance phenomena of the inductor with Type II superconducting core is caused by transportation between outside of the core and inside of the core and is not caused by movements of magnetic walls like a normal conductive core. Accordingly, the variable inductor with superinductor core of Type II has not magnetic wall noise caused by magnetic wall movements and can be driven in a high frequency region over the moving speed of magnetic walls of a normal conductive core.

Having now fully described the invention, it will be apparent to one of ordinary skill in the art that many changes and modifications can be made thereto without departing from the spirit or scope of the invention as set forth herein.

What is claimed is:

1. A superconducting, reversible, variable inductor comprising:
a core made of a Type II superconductor having a reversible magnetic permeability variation range in which the magnetic permeability varies reversibly with respect to a variation of a magnetic field of a predetermined strength or less and falling in the range of from a lower critical magnetic field or more to an upper critical magnetic field or less; and
at least one coil wound around said core.

2. A superconducting, reversible, variable inductor according to claim 1, wherein said Type II superconductor further has a reversible and linear magnetic permeability variation range.

3. A superconducting, reversible, variable inductor according to claim 1, wherein said Type II superconductor further has a reversible and linear magnetic permeability variation range.

4. A superconducting, reversible, variable inductor according to claim 1, wherein said core is formed as a ring by winding of at least one of a tape or a wire, and said coil(s) are wound therearound.

5. A superconducting, reversible, variable inductor according to claim 1, wherein said coil(s) comprise a superconducting cable.

6. A superconducting, reversible, variable inductor according to claim 1, wherein said coil(s) comprise a modulation coil in which carrier wave current for generating a reversible magnetic permeability variation in said core, is passed, a primary coil in which an alternating signal current is passed, and a secondary coil, at both ends of which modulated voltage is generated by the mutual inductance variation in accordance with said reversible, magnetic permeability variation.

7. A superconducting, reversible, variable inductor according to claim 6, further compirsing a compensating transformer for offseting the voltage at both ends of said secondary coil generated in accordance with the residual mutual inductance which remains in said core at an externally applied magnetic field of zero (0).

8. A superconducting, reversible, variable inductor according to claim 1, wherein said coil(s) comprise a detector coil for generating modulated voltage in accordance with an externally applied magnetic field, and said superconducting, reversible, variable inductor is used as a magnetic sensor.

9. A superconducting, reversible, variable inductor according to claim 8, wherein said externally applied magnetic field is detected through the inductance variation of a primary coil.

10. A supercondcuting, reversible, variable inductor according to claim 8, wherein said superconducting, revesible, variable inductor is incorporated into an oscillation circuit to vary the oscillation frequency in accordance with the inductance variation caused by the variation of said externally applied magnetic field, thereby detecting the variation of said externally applied magnetic field through the variation of said oscillation frequency.

11. A superconducting, reversible, variable inductor according to claim 1, wherein said coil(s) comprise a primary coil in which an alternating signal current is supplied by an alternating signal current source.

* * * * *